May 31, 1938.  O. O. RIESER  2,119,291

DEVICE FOR MOLDING COMPLEX LONG DRAW ARTICLES

Filed Nov. 5, 1934

INVENTOR.
*Oliver O. Rieser.*
BY *Allen & Allen*
ATTORNEYS.

Patented May 31, 1938

2,119,291

UNITED STATES PATENT OFFICE 2,119,291

DEVICE FOR MOLDING COMPLEX LONG DRAW ARTICLES

Oliver O. Rieser, Oak Park, Ill., assignor to The Richardson Company, Lockland, Ohio, a corporation of Ohio Application November 5, 1934, Serial No. 751,523

8 Claims. (Cl. 18—19)

My invention relates to the molding of articles of complex shape in a long draw molding operation. By the use of the term "long draw" I imply the manufacture of an article by a plastic molding process, from an initial lump of dough or plastic having no essential shape relationship to the finished article, the molding process being one in which the dough or composition is caused to flow for substantial distances between mold parts, in order to fill the ultimate mold concavity. An example of an article of complex shape ordinarily formed in a long draw molding process, is a modern battery box or case; and hereinafter, but without limitation thereto, I shall describe my invention in connection with the manufacture of such cases in order to make an exemplary disclosure. The common battery box comprises a bottom, four outer walls, and two partitions which divide the box into three cells, all of these parts, together with whatever other interior configurations are desired, such as ribs for supporting the plates, and external configurations, such as handles and panels or other ornamentation, being integrally formed in a single molding step.

Since such an article is molded from an initial lump of dough in the bottom of the mold concavity, it will be clear that the composition must be extruded for relatively great distances between the mold cavity and the plunger assembly, and between the plungers which make up that assembly. There is a tendency for the plastic to rise unevenly in the mold during the pressing operation, so that frequently portions of it rise up against the top forming members before other portions do so, and then the first mentioned portions begin to expand or be extruded in a sidewise direction. Thus, in the last stages of the pressing or extrusion step, various parts of the composition near the top of the box may come together in sidewise directions. While the ultimate pressure is usually effective in making a reasonably firm joint between such pressed-together masses, yet the fibers in the composition may not be very well interlaced across such joint, and the wall may be left in a weakened condition, or even with an incipient flaw. Such flaws are most frequently referred to as "knit lines" or as "hair line cracks". These flaws, occurring in the outer walls of the box, are of some importance; but they are especially troublesome if they occur in the partition walls of the box, because there they may ultimately facilitate a penetration of the walls by the electrolyte in the battery.

In the usual form of battery box, the partition walls are thinner than the side and end walls or portions thereof. This means that the extrusion space between the plungers of the male assembly are less in effective area than some portions of the extrusion space between the plunger assembly, as such, and the outer walls of the mold cavity; and these latter spaces therefore form paths of lesser resistance to the flow of the plastic. As a general rule, therefore, the outer walls, or at least portions thereof, tend to be completely formed before the partition walls are complete, and the flaws above mentioned consequently tend to be formed more frequently in the partition walls.

With these problems in mind, it is a primary object of my invention to provide a method and means for controlling the flow of the plastic in the mold to the end that such flow or extrusion will be held back in those portions of the mold cavity normally tending to offer paths of lesser resistance, and so that the rise of the plastic therein will be so even as to greatly diminish the tendency to produce knit lines.

Other and more specific objects of my invention will be set forth hereinafter, or will be apparent to one skilled in the art upon reading the ensuing specifications. Reference is now made to the drawing, wherein—

The several views which include the plunger mechanism are semi-diagrammatic in nature. In general the features of the mold and plunger in assembly, as such, are known, and it is not necessary for me to particularize as to any details thereof excepting those additional features in which my invention is embodied.

Briefly, in the practice of my invention I control the flow of plastic in my mold by shapes and configurations of at least portions of my molding instrumentalities. I both promote the flow of plastic by shaping the parts and retard the flow of plastic in desired directions by means of the configurations, for the purposes hereinabove set forth. It will be understood that my invention is not limited to the exact shapes or configurations or locations thereof which I shall now particularly describe in connection with the aforesaid exemplary embodiment.

Figure 3:
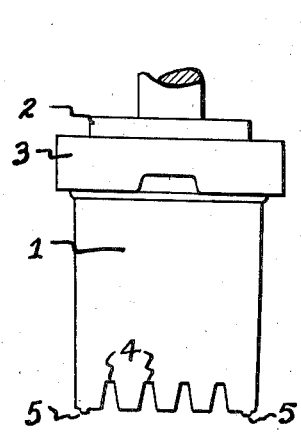
Figure 3 is a side elevational view of a plunger assembly showing a plunger with my retarding means thereon.

It will be seen in Figure 3 that the plunger assembly consists of a plunger 1, behind which two other plungers (not shown) lie in interspaced relationship, and are fastened to a head 2. A stripper plate 3 surrounds the plungers and serves to define the top edges of the box in this particular form of molding device. The plunger 1 is grooved as at 4 to mold the plate supporting ribs in the bottom of the box. I have shown at either end of the plunger, a slight ridge or projection 5. These ridges are of relatively slight height, say of the order of one-sixteenth of an inch, or more or less as desired; and they may either be formed integrally with the plunger by a machining operation or may be attached thereto.

Figure 1:
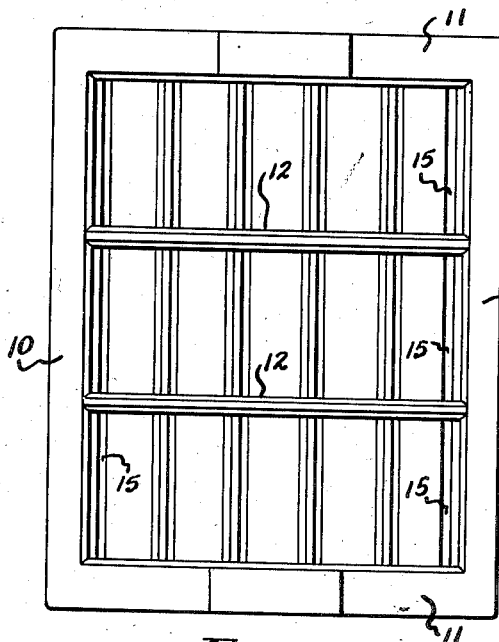
Figure 1 is a top plan view of a battery case which I am using to illustrate the principles of my invention.
Figure 2:
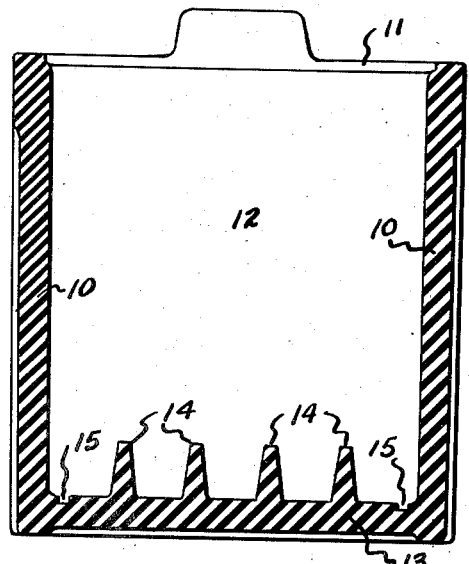
Figure 2 is a sectional view through the middle portion thereof.
Figure 4:
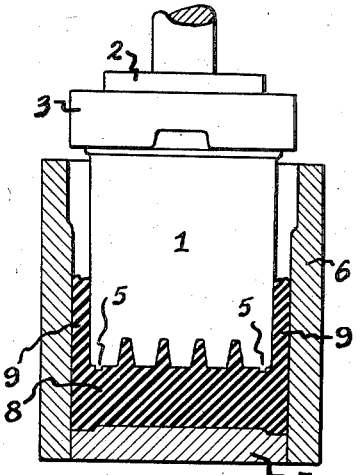
Figure 4 is a sectional view through a mold, showing plastic material being deformed therein.

A consideration of Figure 4 will show a mold block 6, having a bottom plate 7, and containing a charge of plastic 8 into which the plunger assembly is being forced by hydraulic pressure. The action of the sidewise disposed ridges 5 is to offer a resistance to the flow of the plastic 8 into the wall spaces indicated at 9. This resistance, while slight, is sufficient to tend to equalize the flow of the plastic in other portions of the box therewith, and more particularly it is sufficient to cause plastic to rise in the narrower partition spaces at more nearly the same rate. Figure 1 will show, in an exemplary way, the differences in thickness between the side and end walls of the box on the one hand, and the partition walls on the other. The side walls of the box have been indicated at 10, and the end walls at 11. The partition walls are numbered 12, and it will be seen that these are quite a little thinner than the side and end walls. Also it will be understood that these partition walls 12 are formed by extrusion of the plastic between the plunger 1 and contiguous plungers, and that the spaces therebetween are less in effective area than the mold spaces wherein the side and end walls are formed. I have shown in Figure 2 a sectional view of the same case, showing a partition 12, side walls 10, and a bottom 13. The plate supporting ribs are indicated at 14. In both Figures 1 and 2 I have shown shallow grooves 15 formed in the bottom of the box by the ridges 5 in Figures 3 and 4. These grooves are of no consequence in the serviceability of the box; but my novel method and apparatus for molding are effective to the end of producing perfect boxes, and as a solution of the problems to which I have referred above, the disposition of the ridge members 5 may be varied as desired. I have found in the particular structure described herein, that a location of these ridges at the outer marginal portions of the plungers, as shown, is sufficient for the purpose. This is because the flow of plastic into the side walls of the box is the thing which primarily occurs at the expense of the flow of plastic into the partitions. Consequently, interposing a relatively slight resistance to the flow of the plastic into the side walls, is sufficient to hasten the complete formation of the partition walls. The molding instrumentalities may be so made likewise, as to impose resistance to the flow of material into the end walls.

While I do not wish to be limited to any particular theory of operation, yet I believe that my ridges act first to retard the sidewise flow of plastic along the bottom of the plungers, and second, to increase the overall pressure upon the material in the bottom of the mold by reason of the resistance interposed to its outward flow.

Figure 5:
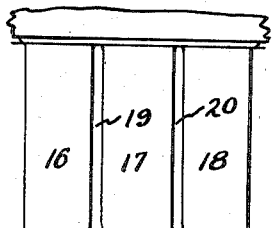
Figure 5 is a fragmentary view of a plunger assembly showing a tapered formation adjacent the partition forming spaces.

In Figure 5 I have shown the individual plungers 16, 17 and 18 of a plunger assembly. The partition-wall forming spaces between these plungers are indicated at 19 and 20. In order to assist the flow of plastic into these partition spaces I taper the lower entrance ways thereto as at 21, thus providing paths of initially lesser resistance to the flow of plastic. The plastic thus gets a good start in the formation of the partition walls and will tend to continue to form these walls evenly with the rest of the box.

Figure 6:
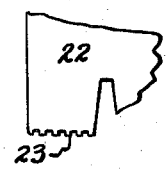
Figure 6 is a fragmentary view of a plunger showing a knurled condition.
Figure 7:
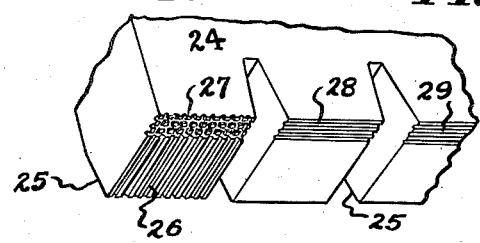
Figure 7 is a perspective of the end of a plunger showing tapering and knurling.

A portion of a plunger has been shown at 22 in Figure 6, in order to indicate a knurled condition of the lower edge thereof as at 23.

In Figure 6 a portion of a plunger has been shown at 24. This is an outer plunger and the face bearing the numeral 24 is the outer face. The opposite face has its lower edge tapered as at 25. Knurling 26 is shown having the function of retarding flow of plastic to the left in the figure to form the left side wall. A partial cross-knurling is shown at 27 to retard the flow of plastic to form the front end wall of the box. This cross-knurling may be continued on other portions of the plunger as at 28 and 29.

Modifications may be made in my invention without departing from the spirit thereof.

Having thus described my invention, what I claim as new and desire to secure by Letters Patent, is:—

1. In apparatus for molding complex articles in a long draw, a mold block, at least one plunger movable therein, said parts cooperating to provide spaces of unequal effective area for the long draw extrusion of plastic, means for inhibiting the flow of plastic along spaces of greater effective area, said means comprising low ridges on said plunger, said ridges being located on the bottom of said plunger.

2. In apparatus for molding complex articles in a long draw, a mold block, at least one plunger movable therein, said parts cooperating to provide spaces of unequal effective area for the long draw extrusion of plastic, means for inhibiting the flow of plastic along spaces of greater effective area, said means comprising low ridges on said plunger, said ridges being located on the bottom of said plunger and near an external edge portion thereof adjacent such path of greater area.

3. In a device for molding battery boxes, a mold block and at least one cell-forming plunger movable therein and cooperating with said mold block to provide paths for the long draw extrusion of plastic therebetween, said paths being of unequal effective area, a ridge on the bottom of said plunger located near an edge thereof adjacent a path of greater effective area.

4. In a device for molding battery cases, a mold block, a plurality of plungers movable therein, said plungers and mold block coacting to define external wall spaces forming paths of lesser resistance to the flow of plastic, and at least one partition space forming a path of greater resistance to the flow of plastic, said plungers having low ridges on their bottom forming portions, said ridges being located near the side portions of said plungers.

5. In a device for molding battery cases, a mold block, a plurality of plungers movable therein, said plungers and mold block coacting to define external wall spaces forming paths of lesser resistance to the flow of plastic, and at least one partition space forming a path of greater resistance to the flow of plastic, said plungers having low ridges on their bottom forming portions, said ridges being located near the side portions of said plungers, said plungers being free of ridges adjacent said partition spaces.

6. In apparatus for molding complex articles in a long draw, a mold block, at least one plunger movable therein, said parts cooperating to provide spaces of unequal effective area for the long-draw extrusion of plastic, and a knurling on the end of said plunger.

7. In apparatus for molding complex articles in a long draw, a mold block, at least one plunger movable therein, said parts cooperating to provide spaces of unequal effective area for the long-draw extrusion of plastic, and a knurling on the end of said plunger, said knurling having portions extending in more than one direction.

8. In apparatus for molding complex articles in a long draw, a mold block, a plurality of plungers movable therein, said parts cooperating to provide spaces of unequal effective area for the long draw extrusion of plastic, there being spaces of relatively greater resistance between said plungers, the lower ends of said plungers adjacent said spaces being tapered, and resistance means on the bottoms of said plungers.

OLIVER O. RIESER.